J. A. WINKLER.
DRIP BOARD.
APPLICATION FILED JULY 10, 1918.
1,330,564.
Patented Feb. 10, 1920.
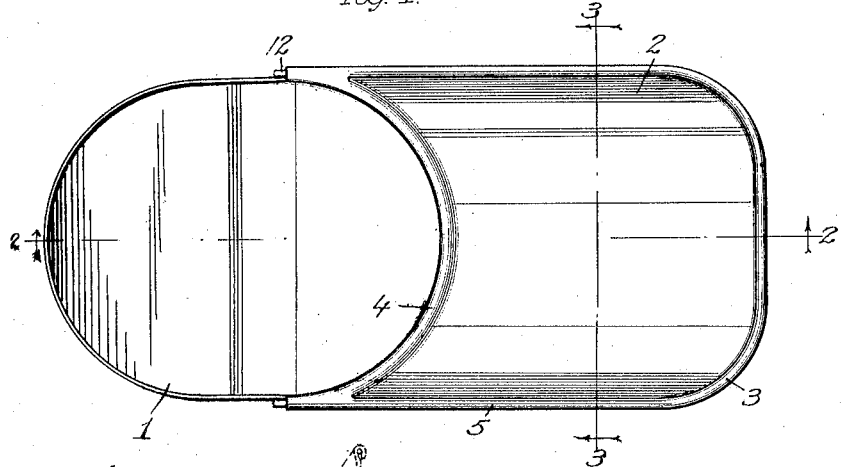
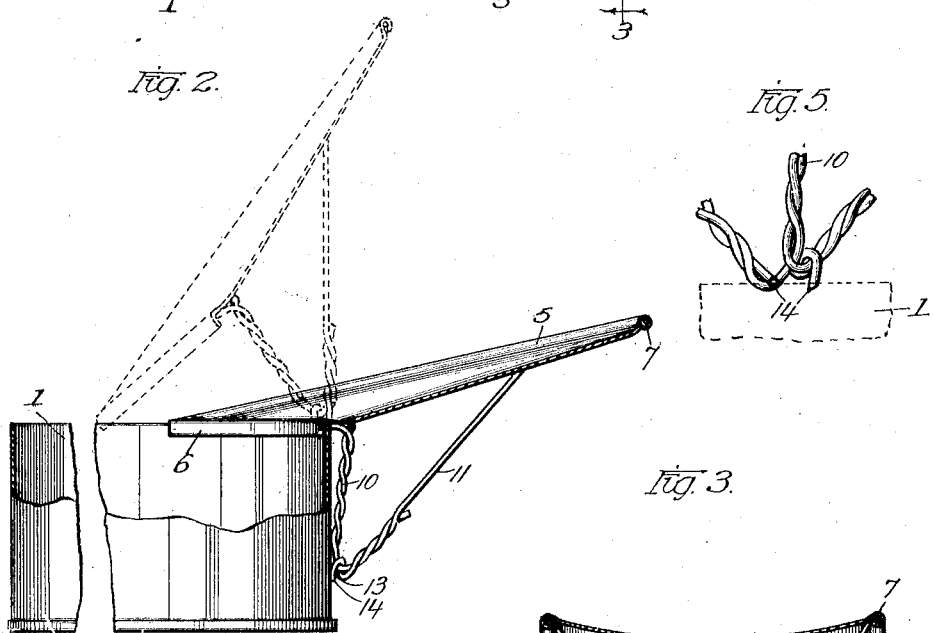
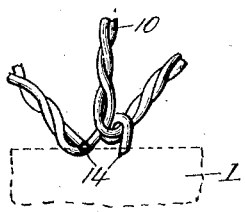
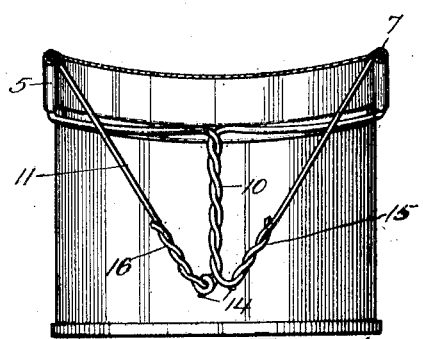
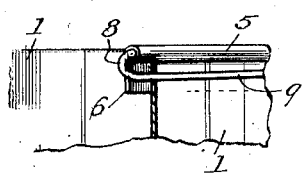
Witnesses:
Robert H. Weir
Arthur W. Carlory
Inventor
Joseph A. Winkler
by Foie Bain & Beau.
Atty.

UNITED STATES PATENT OFFICE.

JOSEPH A. WINKLER, OF CHICAGO, ILLINOIS.

DRIP-BOARD.

1,330,564.     Specification of Letters Patent.     Patented Feb. 10, 1920.

Application filed July 10, 1918. Serial No. 244,336.

*To all whom it may concern:*

Be it known that I, JOSEPH A. WINKLER, a citizen of the United States, residing at Chicago, in the county of Cook and State of Illinois, have invented certain new and useful Improvements in Drip-Boards, of which the following is a specification.

This invention relates to improvements in drip boards and especially drip boards for use by bakers in frying doughnuts and the like, the principal object being the maintenance of the bakery in a clean and sanitary condition and also the saving or salvage of a large quantity of the grease, oil or other material in which the articles are cooked, which heretofore was wasted.

A further object of this invention is the provision of such a device which may be detachably mounted upon the kettle or other utensil in which the articles are cooked and having the tray part located at an incline so that the grease or oil will drain back into the utensil, the device also being adapted to be mounted on the utensil in an extreme inclined position for rapid draining thereof, after a batch or suitable quantity of the articles are cooked so that practically all of the oil or grease is saved for further use.

To the accomplishment of the foregoing and such other objects as may hereinafter appear, my invention consists in the construction, combination and arrangement of parts hereinafter described and then sought to be defined in the appended claims, reference being had to the accompanying drawing forming a part hereof and which shows merely for the purpose of illustrative disclosure a preferred embodiment of my invention, it being expressly understood, however, that various changes may be made in practice within the scope of the claims, without digressing from my inventive idea.

In the drawings—

Figure 1 is a top plan view of a device constructed according to my invention, shown in use on a suitable utensil.

Fig. 2 is a view in section and elevation, taken substantially on line 2—2 of Fig. 1.

Fig. 3 is a view in section and elevation taken substantially on line 3—3 of Fig. 1 looking in the direction of the arrow.

Fig. 4 is a detail perspective view looking at one front end of the device in position on the utensil.

Fig. 5 is a detail of the means for holding the leg of the device on the edge of the utensil.

Referring now to the drawings, the numeral 1 designates a kettle or utensil of a suitable kind in which doughnuts and similar articles are cooked or fried, this receptacle preferably having a circular top edge though that is a matter of desire and preference. Doughnuts are usually fried or cooked in these utensils and lifted out onto a tray on which they drain and during which process a considerable amount of the oil or grease will drop onto the floor of the bakery beside the utensil and besides making a dirty and unsanitary condition, results in a waste of a considerable amount of the oil and the grease. It is the purpose of this invention of mine to save and salvage all of this oil and grease so that it may be used again and so that the bakery may be kept in a much cleaner and more sanitary condition.

The article itself comprises the tray part 2, having rounded ends 3 and having the front part formed with an arcuate cut out portion 4 which is of a shape and size to fit the top edge of the utensil or kettle 1, as indicated in Fig. 1 of the drawing. With the exception of this front arcuate edge portion of the tray, it is provided with the bead 5 entirely around the edge thereof, but the free edge of the arcuate part of the tray 4 is turned down in the form of a lip or flange 6, so as to fit over and inside the top edge part of the kettle or utensil 1 so that all oil, grease or other material draining down from the tray will be directed into the utensil or kettle.

This beaded part 5 of the tray is provided with a suitable reinforcement 7 which takes the form of the wire shown and is bent back upon itself, as at 8, at each front end and extended in substantial parallelism to the arcuate lip or flange 6, as shown at 9, being spaced therefrom a sufficient distance to receive the upper edge of the kettle or other utensil, whereby the tray is securely held in proper position relative to the kettle or utensil.

In order to support the tray in proper position I provide the leg member 10 which projects downwardly from the underside thereof and which is braced by the diverging brace members 11 extending from the leg member to the underside of the outer edges, as clearly shown in Fig. 3. As shown in the drawing, I prefer to form all of these last mentioned parts 7, 8, 9, 10 and 11 of wire which is extended through the bead, as shown, and then bent back upon itself to provide the holding portion 9, the two ends being twisted together to form the downwardly extending leg 10 and then the wire being further extended to form the diverging braces 11, as clearly shown in Figs. 2 and 3. The ends of the wire are at the upper ends of the diverging braces 11.

The parts are so arranged that when the device is in use during the cooking of the doughnuts or other articles it assumes the position shown in full lines in Fig. 2, the tray being supported at a sufficient incline so that any of the oil or grease dripping from the doughnuts or other articles will drain back into the utensil or kettle. When the cooking operation is complete and it is desirable to afford a quicker and more complete draining of the tray it may be placed in the position shown in dotted lines in Fig. 2 with the front edges 12 engaging the top edge of the kettle or utensil at diametrically opposite points and the bottom or foot 13 of the leg resting upon the top edge at a rearward point therebetween, the foot 13 being provided with the fingers 14 projecting in opposite directions for the purpose of holding the same in engagement. It is to be recalled that the lip or flange 6 and the portion 9 of the wire are spaced apart a sufficient distance to receive the front edge of the kettle or utensil, so that the front ends 12 will be held in position. The twisted part of the diverging brace member 11 on the right in Fig. 3, designated by the reference numeral 15 represents the twisted end portions of the wire to form a splice and also to provide one finger 14. In order to provide the other finger 14 on the left hand diverging brace member 11, as it appears in Fig. 3, I provide the additional piece of wire 16, which is twisted around said diverging brace member 11.

It is therefore seen that I have provided a very simple structure for accomplishing the purpose set forth and the use of which will result in a considerable saving and economy in baking or frying doughnuts and other similar articles in bake shops and which will also result in cleaner and more sanitary conditions.

Having described my invention, what I claim is:—

1. A device of the character described including in combination a tray member having an arcuate front edge portion provided with a downwardly extending terminal lip member adapted to engage and rest over the top edge portion of a utensil, a holding member secured to the tray member underneath the same and spaced from said lip and extending in parallelism thereto to assist in holding the tray in position and a leg member secured to the under side of the tray and adapted to engage the utensil so as to support the tray at an inclined position relative to the utensil.

2. A device of the character described including in combination a tray member having its front edge formed of arcuate shape with a downwardly extending lip adapted to be positioned over and engage the top edge of the utensil, a holding means spaced from and extending in parallelism to said downturned lip, said holding means also having a depending leg adapted to engage the kettle or utensil so as to hold the tray at an inclined position.

3. An article of the character described including in combination a tray member having its front portion formed of arcuate shape with a downturned free edge, said tray having a bead formed entirely therearound with the exception of the front edge, and a wire reinforcement located in said bead, the front ends of said wire reinforcement being bent back upon themselves and extending in parallelism to the downturned lip and spaced therefrom so as to form a holding member, said wire also being bent downwardly to form a supporting leg and also formed with diverging members to form braces for said supporting leg which are secured to the underside of the side edges of the tray, said leg member adapted to engage the utensil so as to support the tray at an inclined position therefrom.

4. An article of the character described including in combination a tray member having its front portion formed of arcuate shape with a downturned free edge, said tray having a bead formed entirely therearound with the exception of the front edge, and a wire reinforcement located in said bead, the front ends of said wire reinforcement being bent back upon themselves and extending in parallelism to the downturned lip and spaced therefrom so as to form a holding member, said wire also being bent downwardly to form a supporting leg and also formed with diverging members to form braces for said supporting leg which are secured to the underside of the side edges of the tray, said leg member adapted to engage the utensil so as to support the tray at an inclined position therefrom, the foot of said leg member having projecting fingers and being adapted to rest upon the top edge of the utensil and the front end edges of the tray being adapted to engage the top edges of the utensil so as to hold the tray as a whole in a substantially upright position.

5. An article of the character described including in combination a tray member having its front edge portion formed with a downwardly extending lip adapted to be positioned over and engaging the top edge of a utensil, a holding means spaced from and extending in parallelism to said downturned lip, adapted to engage the outside of the utensil and bracing means adapted to engage the utensil for holding the tray at an inclined position.

6. An article of the character described including in combination a tray member having its front end portion provided with a downwardly extending lip adapted to be positioned over the top edge of a utensil and engage the inner surface thereof, a holding means spaced from and extending in parallelism to said downturned lip and adapted to engage the outside surface of said utensil; a leg connected to said tray and adapted to engage said utensil so as to hold the tray at an inclined position and diverging brace members extending from the lower end of said leg to the sides of said tray.

In testimony whereof I hereunto subscribe my name.

JOSEPH A. WINKLER.